Figure 1:
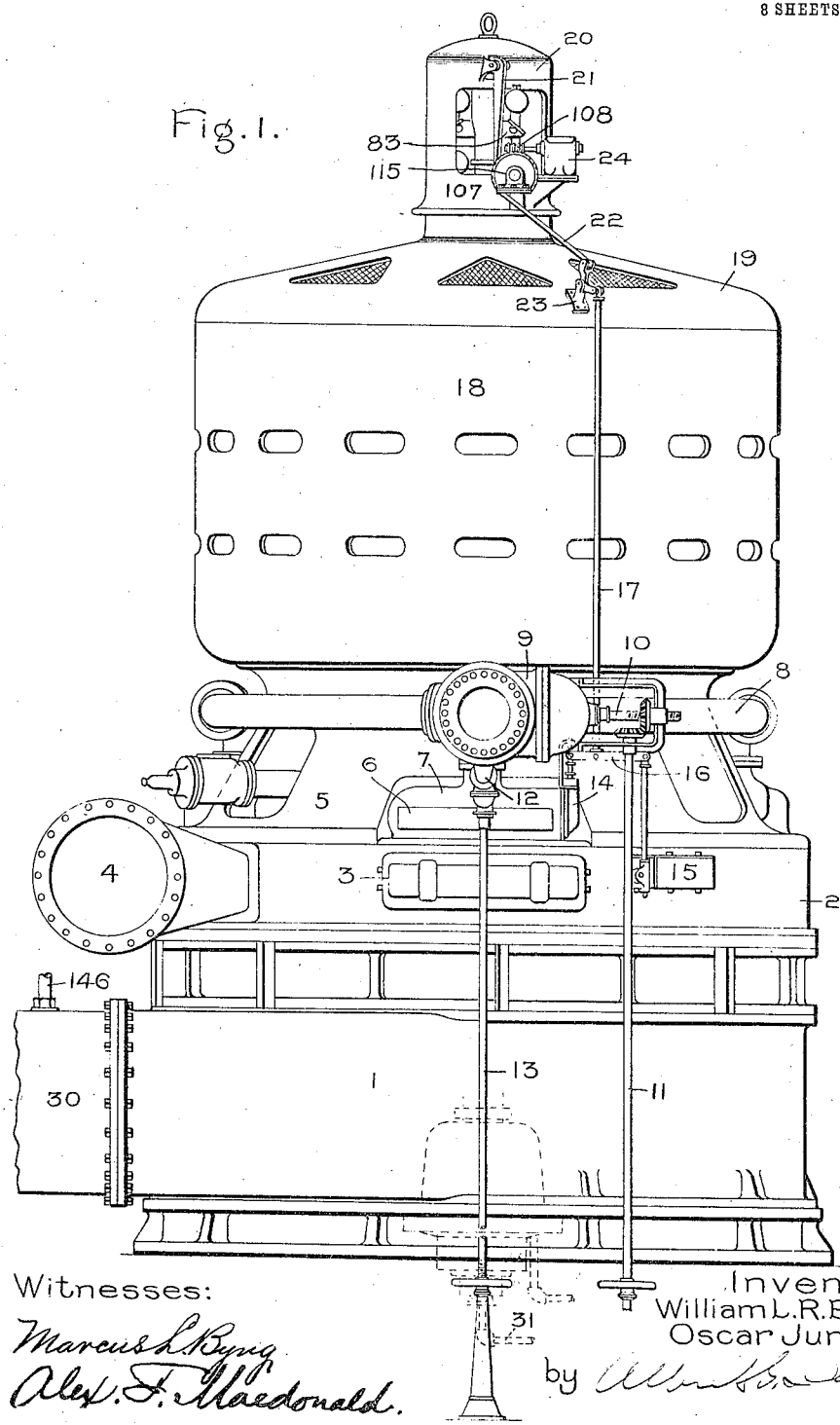

W. L. R. EMMET & O. JUNGGREN
GOVERNOR FOR TURBINES.
APPLICATION FILED MAY 8, 1903.

902,219.

Patented Oct. 27, 1908.
8 SHEETS—SHEET 2.

Witnesses.
Marcus L. Byng.
Alex. F. Macdonald.

Inventors:
William L. R. Emmet,
Oscar Junggren,
by Albert G. Davis Att'y

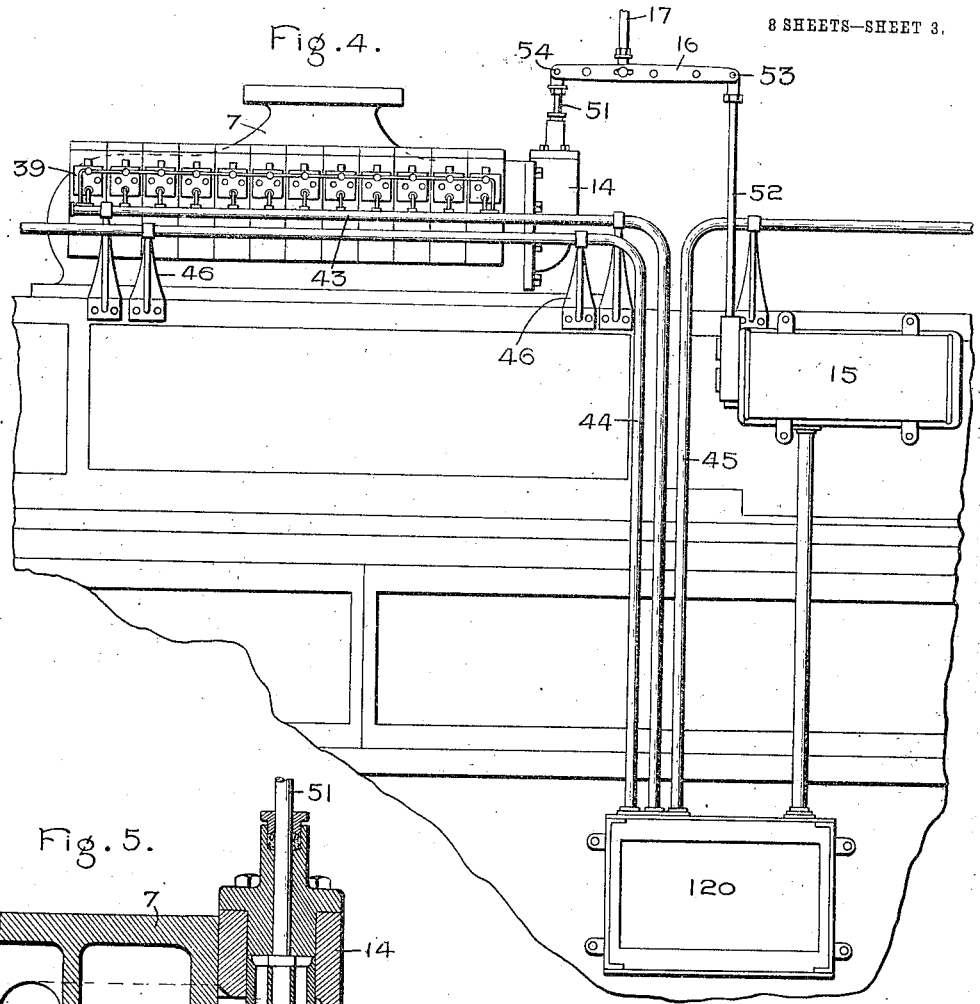
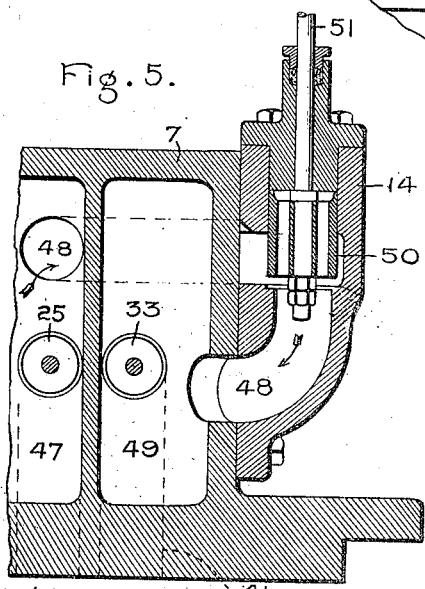
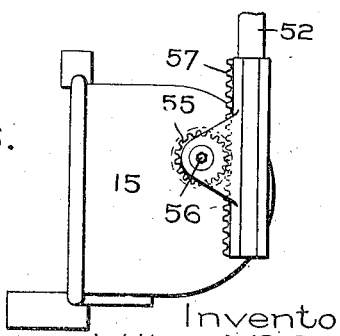

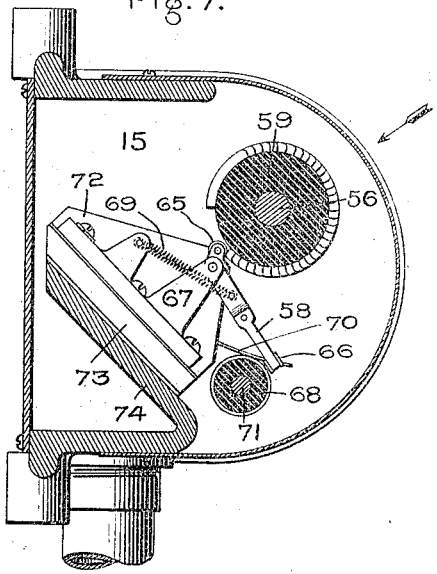
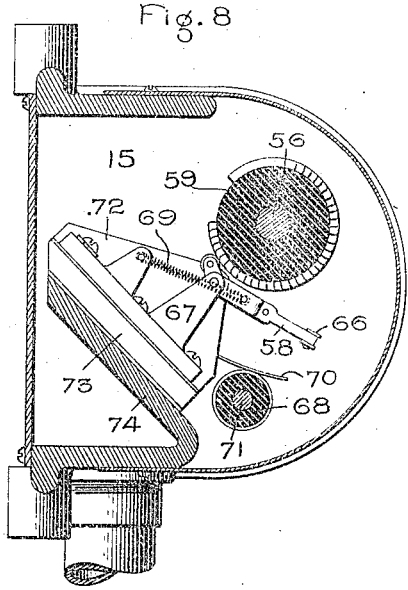
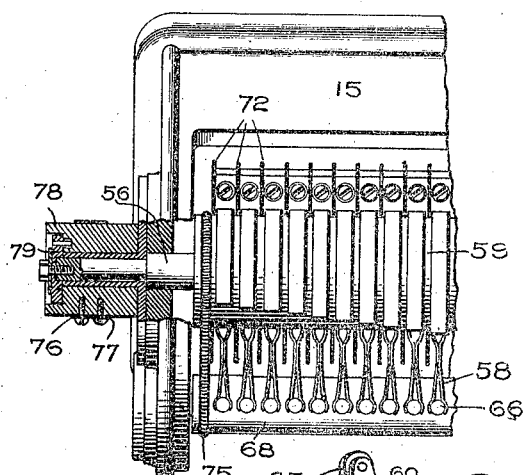
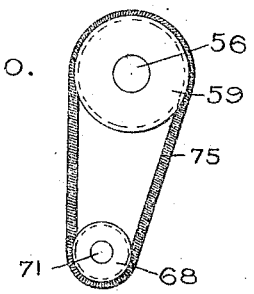
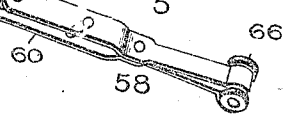

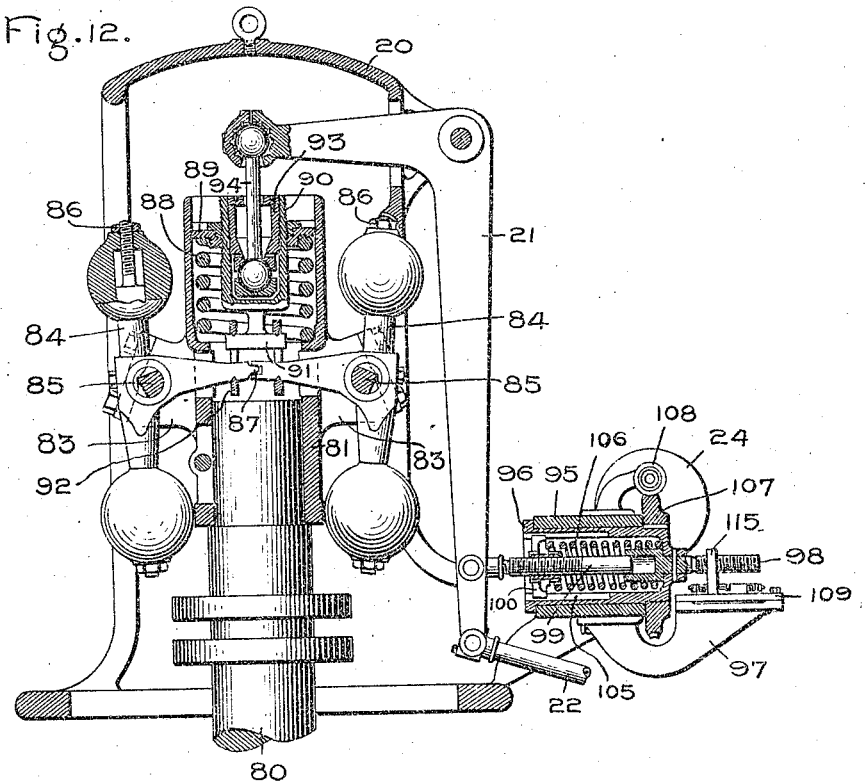
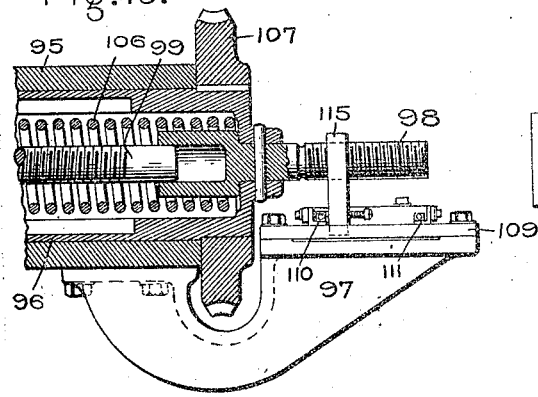
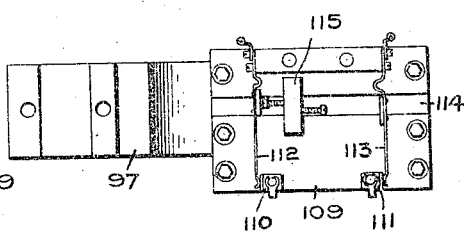

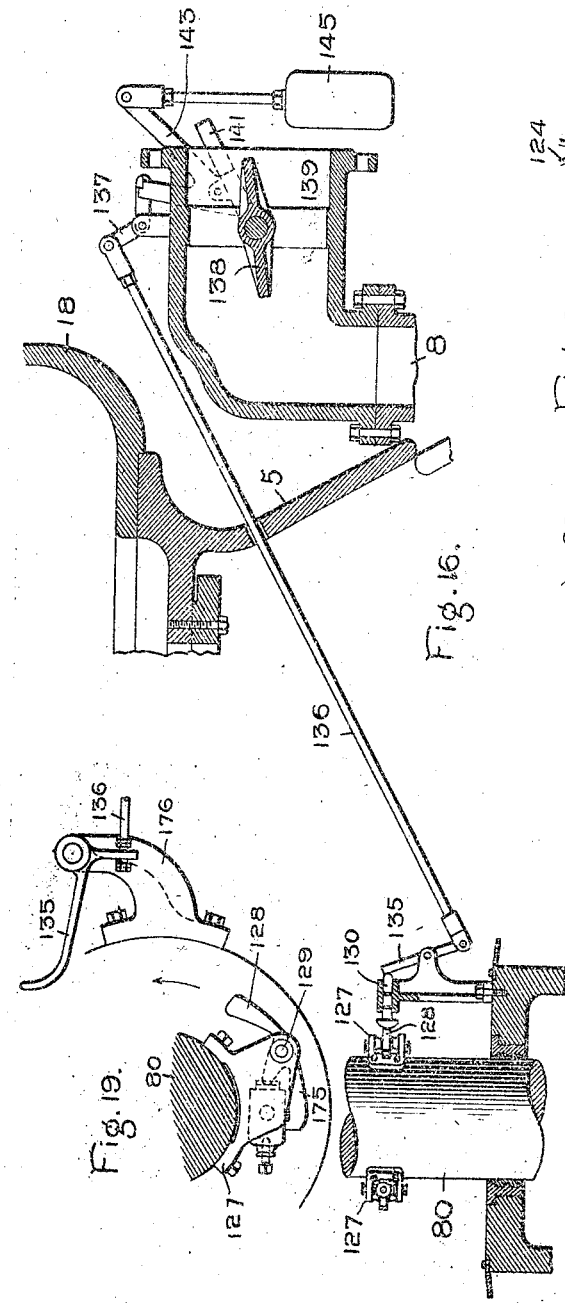
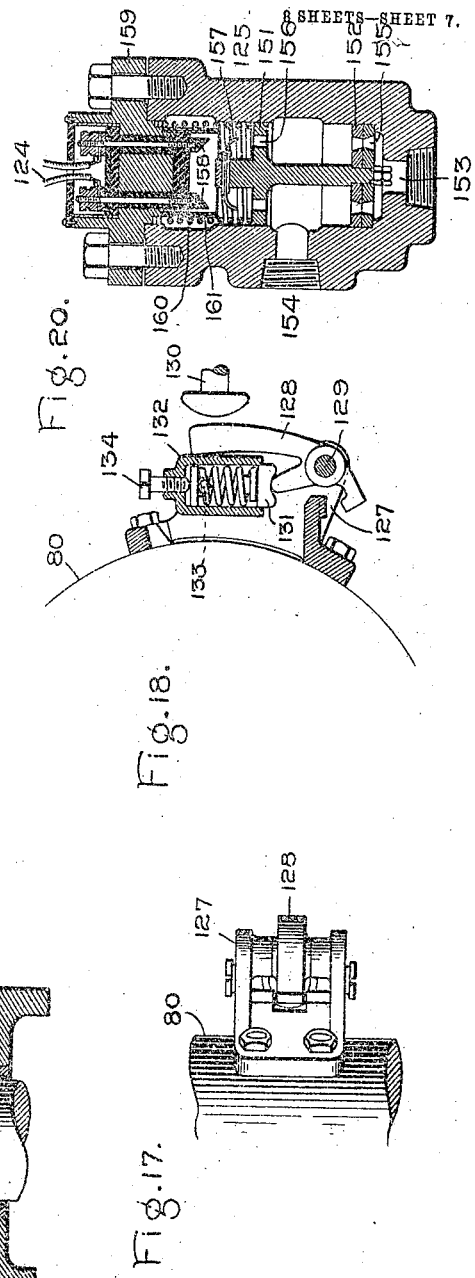

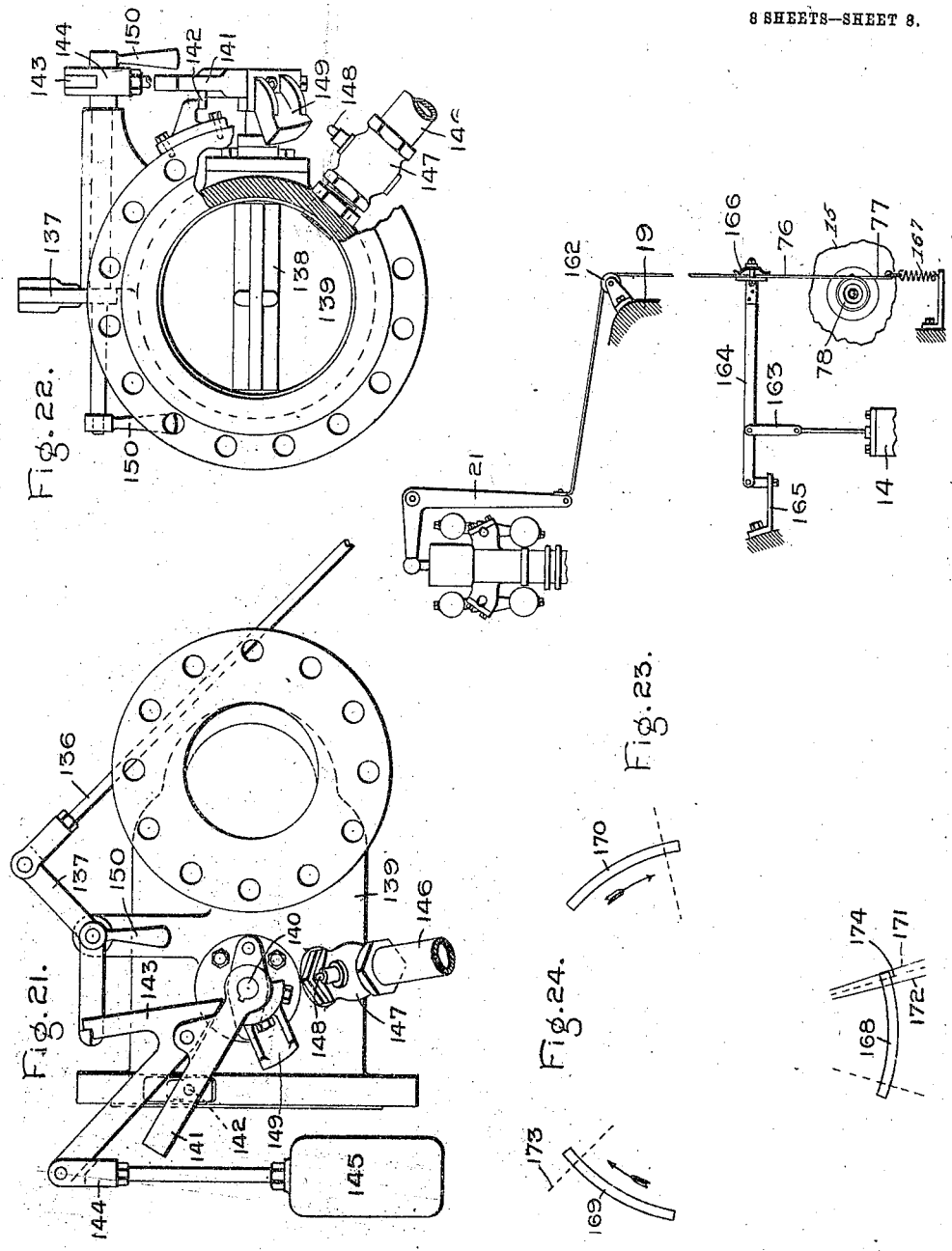

UNITED STATES PATENT OFFICE.

WILLIAM L. R. EMMET AND OSCAR JUNGGREN, OF SCHENECTADY, NEW YORK, ASSIGNORS TO GENERAL ELECTRIC COMPANY, A CORPORATION OF NEW YORK.

GOVERNOR FOR TURBINES.

No. 902,219.  Specification of Letters Patent.  Patented Oct. 27, 1908.

Application filed May 8, 1903. Serial No. 156,142.

*To all whom it may concern:*

Be it known that we, WILLIAM L. R. EMMET and OSCAR JUNGGREN, citizens of the United States, residing at Schenectady, in the county of Schenectady, State of New York, have invented certain new and useful Improvements in Governors for Turbines, of which the following is a specification.

The present invention is, in certain of its aspects, an improvement over the invention described and claimed in Patent 824,546, dated June 26, 1906, of Oscar Junggren, one of the joint inventors of the present application.

We have found that when the total volume of fluid supplied to a turbine or fluid motor is controlled by even a relatively large number of separately actuated valves the amount of motive fluid admitted to or cut off from the bucket wheel or piston, by the opening or closing of a single nozzle or nozzle section, is greater than is usually necessary to compensate for a given change in load. In other words, either too much or too little motive fluid is admitted to the wheel, hence the valve at the side of the belt or column of fluid is continually opening and closing. With this arrangement the regulation is coarse so to speak and there is a tendency for the speed to seesaw above and below the normal. This tendency is counteracted to a large degree by the fly-wheel action of the moving parts, and the quick opening and closing of one or more valves. It is objectionable however in certain machines to have a fluid-actuated valve continually opening and closing for regulating purposes, on account of the inertia of the parts, which tends to cause pounding, and also because of the wear and tear thereon. The smaller the number of nozzle sections employed to handle the fluid the greater will be the noticeable effect of cutting one of them into or out of service. We overcome the objection above pointed out by providing a throttle valve which throttles the admission of fluid to a given nozzle or nozzle section by an amount that is sufficient to meet the conditions of service. This valve is arranged to operate before and after each nozzle valve for small load variations. That is to say, when the throttle valve can no longer meet the requirement by throttling, a nozzle valve operates and the former immediately assumes a new position and oscillates to and fro until a new condition is met which demands the action of a nozzle valve. The throttle-and fluid-actuated nozzle valves are so arranged however with respect to the governor mechanism that sudden and material changes in load will first move the throttle valve to its open position and thereafter the nozzle valves will open one by one o. in a predetermined manner until the supply of motive fluid is substantially equal to the demand, after which the throttle valve comes into play to take care of intermediate load values and other minor load variations. On material decreases in load the reverse action takes place.

Owing to the large volume of fluid required to operate high-powered turbines, the cubical contents of the conduits which convey the fluid are large, hence a considerable amount of fluid may be trapped between the cut-off valve and the nozzles or nozzle valves when the former is suddenly closed. If at the same time the main valve is closed the load is thrown off, there is a tendency for the turbine to race in case of leakage through the nozzle or nozzle sections because it requires only a comparatively small amount of fluid to drive the wheel or wheels under these conditions, particularly where the turbine is connected to a condenser which maintains a high vacuum. In the latter case the vacuum creeps back into the turbine, frequently being noticeable in the first stage, and the resistance offered to the rotation of the wheel or wheels is correspondingly decreased.

A second prominent feature of our invention consists in providing means whereby the steam, instead of being trapped in the conduits when the emergency cut-off valve is closed, is discharged either to atmosphere or into a condenser. In the former case air is admitted to the turbine casing or shell and the condenser, thus breaking the vacuum and opposing the resistance of the air to the rotation of the wheel or wheels. In the latter case the discharged steam is condensed and afterwards returned to the boiler.

Turbines are usually arranged to drive a common load. For example, each turbine may have a generator which is connected to the bus-bars of the power station. It being preferable, in so far as it is possible, to operate each turbine at or about its full load capacity, it becomes necessary to cut turbines into and out of service as the load changes, and to do this it is necessary to adjust the governor or governors of the incoming turbine or turbines so that it or they will take the proper proportion of the load, and preferably this should be done from some point adjacent to the switch-board where the load conditions can be observed by suitable indicating devices. In order to fulfil this condition we provide an electric motor that changes the tension on an auxiliary spring, which coöperates with the main spring of the governor to oppose the action of the centrifugal weights.

It is of the utmost importance to constantly maintain the circulation of lubricant to the bearings when the turbine is running, this being particularly true where the weight of the revolving structure is supported by a step-bearing, since failure of said circulation for any appreciable time means the ruin of the bearing or bearings, and perhaps of the intermediate and wheel buckets. This being so, it follows that it is of equal importance to provide a means for causing the governor to shut off the motive fluid as soon as there is any interruption in the supply of lubricant, or as soon as it decreases by a certain predetermined amount. To meet this condition we provide a means that maintains the governor in working relation so long as the flow of lubricant continues uninterrupted, but as soon as it falls off by a certain amount or ceases the governor shuts off the supply of motive fluid.

Having set forth in a general way some of the principal considerations requisite to the satisfactory operation of turbines, and objections to existing structures, it follows that our invention has for its object to provide a governing system which will fulfil the conditions specified, at the same time overcoming the objections, and this with apparatus which is efficient in operation and simple in construction.

In the accompanying description and claims appended thereto we proceed to set forth with particularity and exactness what we believe to be novel and our invention.

Figure 2:
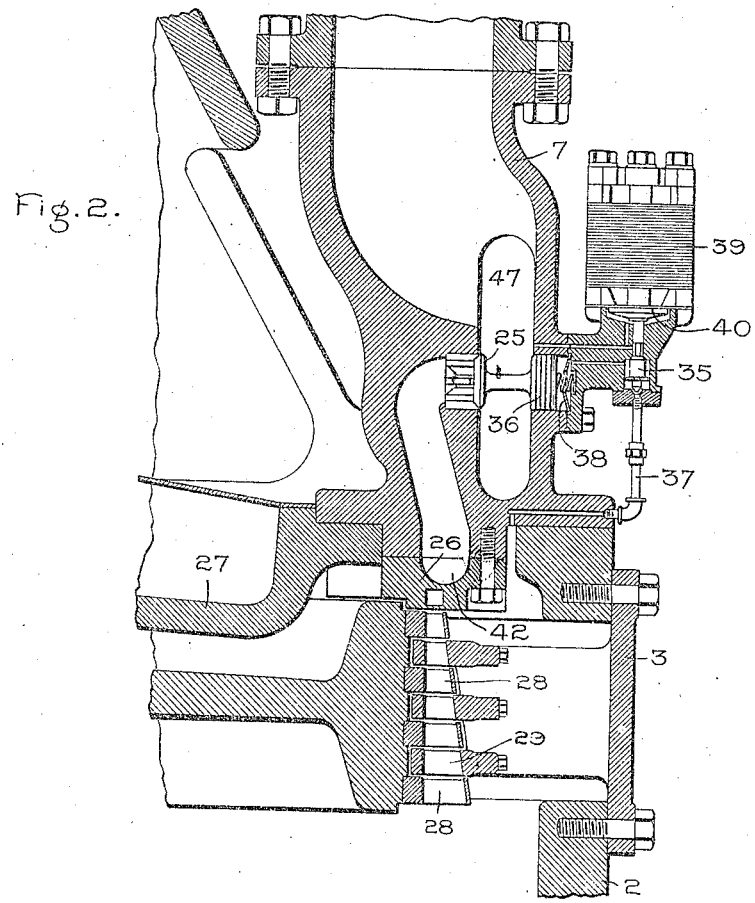
Figure 3:
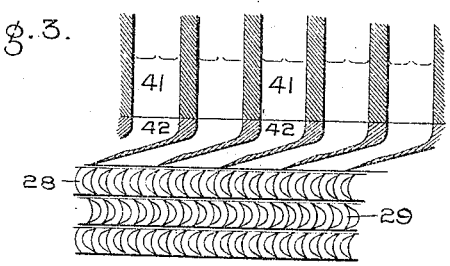
Figure 15:
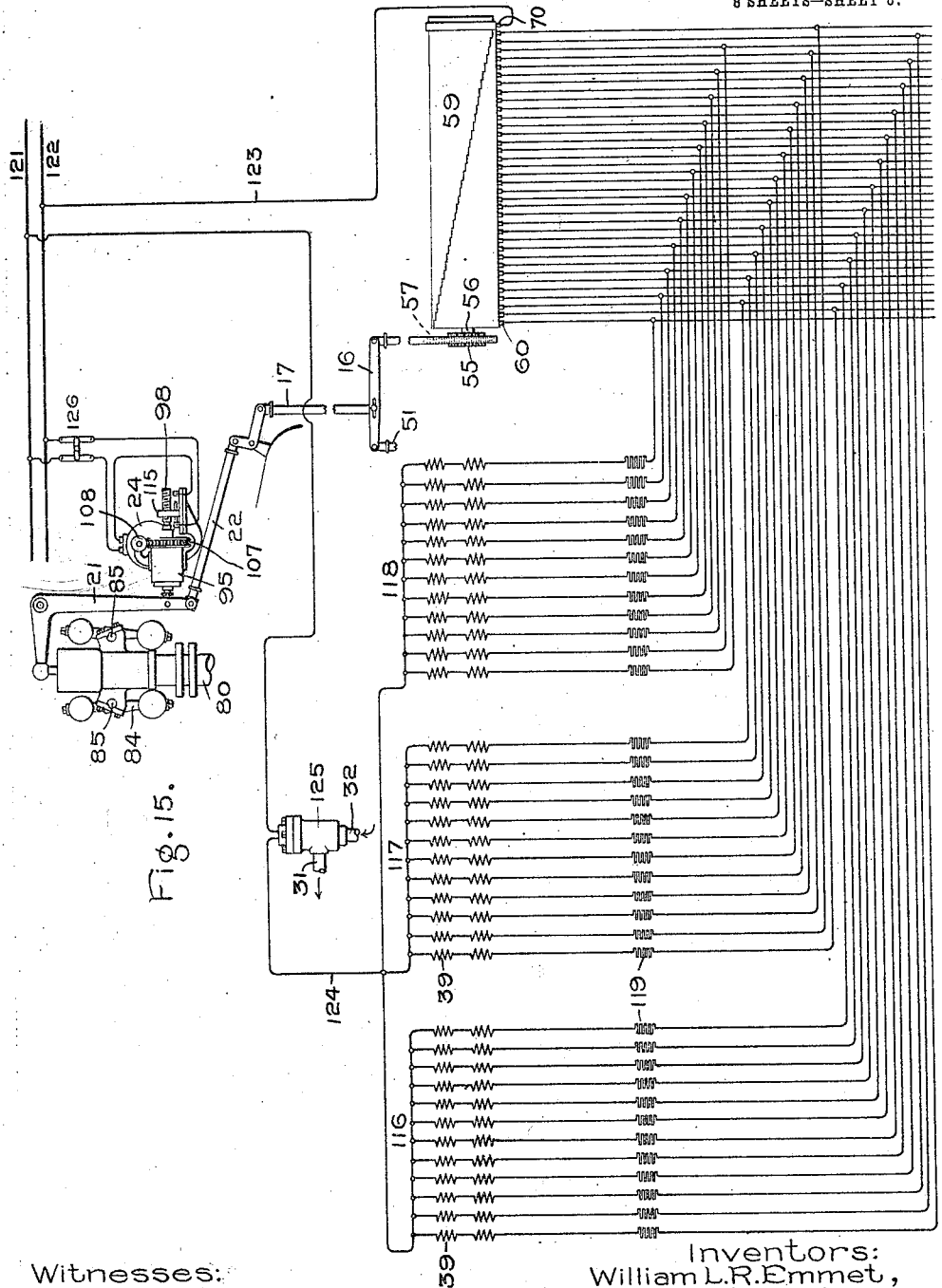

In the accompanying drawings, which illustrate one form which our invention may take, Figure 1 is a view in elevation of a vertical turbine; Fig. 2 is an enlarged sectional view showing the relation of the valve mechanism to the nozzles and buckets; Fig. 3 is a section taken substantially at right angles to that of Fig. 2, and illustrates the relation between the nozzle sections and the buckets; Fig. 4 represents on an enlarged scale a portion of a turbine together with a group of nozzles and their controlling means; Fig. 5 is a vertical section through the throttling valve of the governor; Fig. 6 is an end elevation of the electrical controller; Fig. 7 is a cross-section of the controller showing a brush in engagement with the contact cylinder; Fig. 8 is a similar view showing a brush moved out of engagement with the contact cylinder; Fig. 9 is a partial plan view of the controller viewed in the direction of the arrow, Fig. 7; Fig. 10 shows a means employed to impart rotary motion between the contact and cam cylinders of the controller; Fig. 11 is a perspective view of one of the contact fingers; Fig. 12 is an enlarged detail view, partially in section, of the speed-responsive device, together with the means employed to adjust the tension of its opposing spring; Fig. 13 is an enlarged detail view, principally in section, of the switch for disconnecting the governor motor whenever the tension on the governor spring is increased or decreased beyond a certain predetermined amount; Fig. 14 is a plan view of said switch; Fig. 15 is a diagrammatic view illustrating the circuit connections of the governor; Fig. 16 is a detail view in section of the emergency governor; Fig. 17 is a detail view in side elevation of one of the weights and its holder for actuating the emergency governor; Fig. 18 is a plan view, partially in section, of the structure shown in Fig. 17; Fig. 19 is a plan view of a modified form of the auxiliary governor wherein slightly different means are employed to trip the butterfly valve; Fig. 20 is a detail view in vertical section of the fluid-actuated switch that acts as an emergency device to cut off the steam or other motive fluid in case of failure of the oil supply to the bearing or bearings; Fig. 21 is a detail view in side elevation of the means employed to trip the butterfly valve; Fig. 22 is a front elevation of the structure shown in Fig. 21; Fig. 23 is a detail view of a slightly modified form of mechanism for actuating the controller cylinder; and Fig. 24 is a diagrammatic view showing the relation of the columns of motive fluid and the effect of the controlling devices thereon.

In the drawings, 1 represents the base of the machine which may be connected to a condenser if desired. Mounted on the base of the machine is a casing 2 which incloses two or more bucket wheels and intermediates, the latter being located between the rows of wheel buckets. The intermediate buckets are supported by the plate 3 which is detachably secured to the wheel casing or shell. The left-hand side of the casing is provided with a conduit 4 which is closed when the turbine is running condensing and is connected to a suitable discharge conduit when the turbine is running non-condensing. Situated directly above and mounted on the casing is a stool 5 which is provided with a number of openings, preferably spaced equidistant, to receive the groups of nozzle valves 6. The nozzles and the valves for controlling them are divided into a number of groups, and the several groups are distributed at equidistant points around the periphery of the wheel. The construction of the nozzles and the valves for controlling them will be more fully described hereinafter. Surrounding the stool and arranged to supply motive fluid to the valve chest 7 is a circular conduit or pipe 8. The admission of steam or other motive fluid to the conduit is controlled by the gate-valve 9. The valve is provided with a screw-threaded stem 10 on which is mounted a gear that meshes with a similar gear on the upper end of the spindle 11. Near the lower end the spindle is provided with a hand wheel which is rotated in order to impart longitudinal movement to the valve stem 10. Owing to the large amount of steam which has to be handled by the gate valve an auxiliary valve 12 is provided by means of which steam is shunted past the main valve for the purpose of equalizing the pressures on opposite sides thereof. This auxiliary valve is controlled by a spindle 13 and a hand wheel that is screw-threaded thereto. The conduit 8 has a substantial cross-section so that the flow of steam to the several valve chests will be practically unrestricted. This means that considerable steam is trapped between the butterfly-valve and the nozzle valves when the turbine is suddenly shut down. The amount of steam thus trapped is sufficient to cause the turbine to race in case the load is thrown off. This is especially true where the turbine is operating with a condenser and one or more of the nozzle sections or passages remains open due to a faulty valve. Generally speaking, we consider it desirable to provide each of the nozzle sections with a controlling valve but under certain conditions it may be deemed advisable to provide one valve for two or more sections. We consider it essential however to so arrange the governor that it can cut off all of the steam to the nozzles. With a construction of the kind specified there is liable to be a certain amount of leakage around the nozzle valves when closed, and this leakage would at times be sufficient to cause the turbine to race unless special means were provided to permit the steam within the conduit to escape. This matter will be more fully referred to hereinafter in connection with the butterfly valve and emergency governor.

Mounted on the end of one of the valve chests is a valve 14, Fig. 1, which varies the effective discharge of fluid from one of the nozzle sections and in this manner compensates for minor changes in load, and thus causes the regulation to be finer than where a nozzle section is cut completely into or out of service unless the latter action is at times very rapid or the fly-wheel action of the moving parts great, or both. In the present illustration of our invention the valve 14 is of the throttling type.

Mounted on the side of the casing 2 is an electrical controller 15. This controller and the throttling valve are connected by a lever 16, which in turn is connected by a rod 17 with the governor. As the rod moves up and down it imparts motion to the controller cylinder and also to the throttle valve, the parts being so arranged that the first portion of the movement of the rod affects the throttle valve whether it be moving upward or downward. After the valve has moved a predetermined distance the controller cylinder rocks forward or backward by an amount sufficient to energize or deënergize a magnet and cut into or out of service one of the sections of the nozzle.

When the load varies widely the valve will stay in an open or closed position until the contact cylinder has caused the proper number of valves to open or close.

Mounted on the stool 5 is a dynamo-electric machine 18 of any suitable character, the one shown being designed to furnish alternating current. The casing of the dynamo is provided with a cover 19, and mounted thereon is a dome 20 which contains the governor mechanism. Motion is imparted from the governor to the rod 17 by a bell-crank lever 21 and a rod 22, the latter being connected to the rod 17 by a bell-crank lever which is supported in a bracket 23 that is carried by the cover of the dynamo. In order to change the tension on the governor spring, an electric motor 24 is provided which acts through suitable worm gearing and a spring on the bell-crank lever 21.

Referring to Fig. 2, 7 represents the valve chest, and 25 one of the nozzle valves for controlling the admission of fluid to a section of the nozzle 26. The latter is bolted to the under side of the steam chest and is removable therewith. The steam chest is provided with lateral flanges that engage with the cover 27 of the wheel casing or shell and act as supports therefor. The bucket wheel is provided with one or more rows of buckets 28, and where two or more rows are provided the intermediate buckets 29 are mounted between the rows. The intermediate buckets are carried by a support or plate 3 that is bolted to the shell or casing 2. The casing is directly connected to a condenser 30 into which the steam is discharged.

Each nozzle valve is controlled by an auxiliary or secondary valve 35 sometimes called a relay valve which in turn controls the passage of steam to and from the cylinder space back of the piston 36. When the valve is in the position shown, the space back of the piston is connected to the inside of the shell of the first stage by the pipe 37, and this means that the nozzle valve 25 is on the point of opening. In order to insure prompt closing of the nozzle valve a coil spring is mounted in back thereof. An arched plate 38 is provided that surrounds the spring and is intended to act as a cushion to prevent the piston 36 from pounding. The secondary valve 35 is under the control of an electromagnet 39 which acts on the head or enlargement 40 of the secondary valve stem. When energized the magnet raises the valve and when deënergized the valve drops due to gravity. The construction and arrangement of all of these nozzle valves and the means for operating them being the same, further description thereof is unnecessary.

Referring to Fig. 3, we have shown a plurality of steam chest passages 41 each of which is governed by a nozzle valve 25. Situated just below each of the passages and in line therewith is a bowl 42 of a nozzle section. The nozzle sections are each designed to convert a certain amount of the pressure of the steam into velocity and discharge it against the wheel buckets 28 in a manner to cause rotation thereof. After the motive fluid leaves the wheel buckets it impinges on the intermediate buckets 29 which in turn reverse its direction and discharge it against the adjacent wheel buckets at the proper angle. Expanding nozzles are shown in the drawing for discharging fluid to the wheel but other forms of fluid-discharging devices can be employed without departing from the broader aspects of our invention.

Referring to Fig. 4, we have shown one group of nozzles, together with their controlling means. In the present instance the nozzles or nozzle sections are divided into groups each of which contains twelve sections of the character shown in Fig. 3. This means that there is a total of thirty-six nozzle sections in the first stage of the machine. Each of these nozzle sections is adapted to be cut into and out of service by a nozzle valve 25 which has an open and a closed position but no intermediate. If all of the sections are in service and one of them is cut out it means that the total volume of fluid delivered to the wheel is decreased by one thirty-sixth. We have found that in the case of large units this regulation is not quite fine enough unless one valve is capable of opening and closing rapidly under certain conditions, and we therefore provide a relatively slow moving throttling valve which is continually opening and closing as the conditions of service vary. This throttling valve is situated at one side of the column of fluid delivered to the wheel, and preferably on the leading side, it being found best to vary the width of the column delivered to the wheel by cutting the trailing sections of the nozzle into and out of service one after the other but this can be reversed if desired. By this means the continuity of the fluid stream as a whole can be maintained, but the width of the column or belt can be decreased to suit the required conditions of service. By locating the throttling means at one side of the column the losses due to throttling one section are reduced to a minimum.

7 represents the valve chest, and mounted on the front face thereof are a plurality of electromagnets 39. The connections of these magnets will be referred to more fully hereinafter. The wires conveying current to and from the magnets are incased in a suitable sheath 43. The wires for the second and third groups of magnets are contained in the sheaths 44 and 45. In the present instance these sheaths take the form of tubes which are supported by brackets 46 that are bolted to the casing of the turbine.

Situated on the right-hand end of the valve chest is a throttle valve 14 that is best illustrated in section in Fig. 5. Referring to this figure, 41 represents the passage leading to the nozzle bowls 42, as shown in Fig. 3. The section is so taken that the observer is looking directly at the nozzle valves 25. 47 represents a chamber in the chest which is always in communication with the steam-carrying conduit 8. A good idea can be had of this chamber, when viewed from a point at right angles to the one shown, in Fig. 2. At the upper end the chamber is provided with a port or passage 48 which communicates with a small chamber or pocket 49 that is formed in the end of the steam chest adjacent to the throttling valve. Between this pocket or chamber and the passage 41 leading to the nozzle bowl is a nozzle valve 33 by means of which the section can as a whole be cut into or out of service. This valve is advantageous in shutting down the machine. Between the receiving and discharge ends of the passage 48 is a throttle valve 50 that is moved up and down by the centrifugal governor. This valve is preferably of the balanced type, and as it moves up and down it varies the size of the opening into the lower part of the conduit 48 and in this manner the volume of steam or other elastic fluid which flows to the first nozzle section on the leading end of the group; it being understood that the rotation of the bucket wheel in Fig. 4 is from right to left. It is true that in order to obtain the maximum efficiency with an expanding nozzle it is necessary to maintain the volume constant for which it is intended, and that to decrease the volume flowing through the nozzle means that the nozzle or nozzle section does not act as efficiently as the other nozzles; but since this section forms such a small part of the total it can be disregarded, and at the same time we are able to obtain closer regulation, which is a matter of extreme importance.

Referring to Fig. 4, the valve stem 51 of the throttle valve is connected to a lever 16 which in turn is connected to the governor rod 17 and to the rack 52 that actuates the cylinder of the controller 15. The governor rod 17 imparts longitudinal movement to the throttle valve, and rocking or rotary motion to the controlling cylinder as it moves up and down. The rod 17 is attached to the lever 16 at a point nearer the valve stem than the rack. This is done so that when the governor rod rises it will first move the left-hand end of the lever upward around the pin 53 as a pivot, and in this manner raise the throttle valve to its extreme upper position, after which the pin 54 acts as a pivot and the rack-rod 52 imparts movement to the controller cylinder. On the other hand, assume that the governor rod is moved downwardly, it first causes the throttle valve to close gradually, after which movement is imparted to the controller cylinder.

From the foregoing it will be seen that a gradual throttling of one nozzle section takes place before the cylinder is rotated, which means that this throttling takes place before and after a complete nozzle section is cut into or out of service by the controller. There is of course a certain amount of friction in the valve and the controller, and the arrangement of levers should be such that the parts will operate in the manner specified; and while we have shown what we have found to be a satisfactory arrangement, we do not wish to be understood as limiting ourselves thereto.

In Fig. 6 is shown an end view of the controller 15 with a pinion 55 mounted on the end of the cam shaft 56 and engaging with the rack 57 that is carried by the lower end of the rod 52.

Referring to Figs. 7 to 11 inclusive, the mechanical construction of the controller will be described. It is essential in constructions of this kind that good bright contact surfaces be presented to the brushes or fingers at all times, and it is also important that the brushes or fingers be so arranged that the circuit between them and the contact cylinder will be quickly interrupted when it is desired to make a change in the circuit connections of the magnets. To this end we provide a contact finger or brush 58 for each magnet that is to be controlled, since we find this arrangement to be desirable, but under certain conditions the number of brushes can be different from the number of magnets that are to be controlled. Mounted on the shaft 56 within the controller casing is a cam cylinder 59 having the necessary cam surfaces arranged to actuate the brushes successively. The arrangement of these cam surfaces is well shown in Fig. 9. It will be noted that the length of these surfaces successively increases from left to right, which means that they will engage with the brushes one after the other. After the brush is moved into or out of engagement with the contact cylinder further movement of the cam cylinder has no effect thereon. From this it follows that each brush is actuated by a mechanism that includes a lost-motion connection. The arrangement is made necessary by reason of the fact that certain of the brushes must be kept in engagement with the contact cylinder to energize the controlling magnets 39 while the other brushes must be kept out of engagement with the cylinder to permit the nozzle sections to be cut out.

The brushes are composed of two metal plates 60 that are secured together in any suitable manner. The end adjacent to the cam cylinder is provided with a roller 65, which roller is arranged to engage with a cam surface on the cylinder. The opposite end of the contact device is provided with a detachable contact brush 66. The brush is held in place by the spring in the metal plates forming the device itself, and by slightly rounding the outer end of the plates the brush can be readily be slipped into place. The contact devices are pivotally mounted in a support 67 and the pivot is located adjacent to the end of the device carrying the roller. The object of this arrangement is to impart a considerable movement to the brush 66 for a very small movement of the roller 65, and in this manner insure the complete interruption of the circuit between the brush and the contact cylinder. The brushes are normally held in engagement with the contact cylinder 68 by the spring 69. Current is conveyed to the contact cylinder by the brush 70 or by other suitable means. The contact cylinder is mounted on a shaft 71 that is supported in bearings formed in the ends of the controller casing. The brushes are separated one from the other by partitions 72 so as to prevent the arc from jumping from one brush to another. The contact devices as a whole are mounted on an insulating support 73 which in turn is mounted on an inclined support 74. The parts are mounted as shown so that they may readily be inspected when the casing is removed. In order to transmit motion from one cylinder to the next, a belt 75 is provided which may be of any suitable character. In the present instance it is shown as consisting of a coiled extension spring, the object of this arrangement being to insure that the belt shall be tight at all times. It is arranged to run over grooved pulleys attached to the ends of the shafts 56 and 71. As shown the contact cylinder has a greater angular movement than the cam cylinder, and the contact surfaces thus make a sliding or wiping engagement which keeps said surfaces bright and clean.

In Figs. 1, 6 and 15 we have shown the cam cylinder operated by a rack and pinion, and in Fig. 9 is shown a slight modification wherein two metallic ribbons 76 and 77 are employed. These ribbons are wound around the sleeve 78 in opposite directions so that when the ribbon 76 is subjected to stress it moves the cylinder in one direction and when the ribbon 77 is similarly subjected the cylinder is moved in the opposite direction. This feature of operating the cylinder will be more fully referred to hereinafter in connection with Fig. 23. The cam cylinder shaft 56 is extended outward beyond the controller casing and is provided with a detachable plate 79 which is connected by means of a pin to the ribbon-carrying sleeve 78. By removing the plate 79 the sleeve and the attached ribbons can be removed without disturbing the governor, thus permitting the cam cylinder to be removed.

Referring now to Figs. 12 to 14 particularly, the construction of the centrifugal governor will be described. 80 represents the main shaft of the turbine and dynamo, which shaft is provided at its upper end with a holder 81. This holder is provided with two pairs of outwardly extending arms 83 between which are mounted the centrifugally acting weights. Two weights are provided on each side of the axis of the shaft, and are supported by the lever 84. It will be noted that the knife-edge pivot 85 for the weight arms or levers is nearer the upper weight than the lower. This means that the lower weight will overpower the upper weight and as its power increases due to centrifugal force, the effect of the upper weight is correspondingly decreasing. To state the matter in a different way, the weights are arranged in pairs and are centrifugally and differentially acting on the governing mechanism. In the present illustration we have shown the weights as being of the same size, with the pivot arranged nearer one weight than the other, but obviously the equivalent of this arrangement can be employed, namely, making one weight heavier than the other and supporting them at points equidistant from the knife-edge pivot. In order to adjust the weights the ends of the supporting lever 84 are screw-threaded, and mounted thereon are adjusting nuts 86. The supporting levers 84 are T-shaped, and the adjacent ends of the lever are provided with means, such as a tooth-and-groove 87, whereby the action of the weights will be synchronized.

The holder 81 is provided with a cylindrical extension at its upper end in which is located the coiled compression spring 88. This spring is situated between a fixed abutment formed by a shoulder on the holder and the adjustable abutment 89. The latter comprises a shouldered plate which is secured to the threaded sleeve 90 by a nut. The lower end of the sleeve is provided with a projection 91, and between it and the adjacent ends of the weight levers are links 92 having knife-edge surfaces at the points of engagement. Mounted within the sleeve 90 is an adjustable holder 93 for the lower end of the dumb-bell link 94. This holder is provided with an opening around the body of the link to receive lubricant, and since the sleeve 90 is closed at all points except its upper end, any oil supplied to the link connection is prevented from escaping. The holder is secured in place by a lock nut which surrounds the link and is separated therefrom by a small clearance. This nut also serves as a means for preventing the lubricant from escaping. The upper end of the dumb-bell link is mounted in the end of the short arm of the bell-crank lever 21. This lever is pivoted in extensions formed on the dome 20 that surrounds the moving parts of the governor. The lower end of the bell-crank lever is connected by the rod 22 with the throttling valve 14 and the controlling cylinder.

Turbines are customarily so operated that they drive a common load; that is to say, the generators are connected to the bus-bars on the switchboards, and the turbines are cut into or out of service according to the load on the system. In order to accomplish this in a satisfactory manner, it is necessary to provide means for adjusting or synchronizing the governors of the several machines supplying power to the switchboard. To accomplish this we provide each governor with an auxiliary spring which acts in conjunction with the main spring to oppose the resulting action of the centrifugally acting weights. This spring is adjusted as to its tension by means of an electric motor which can be controlled from the switchboard or other suitable place where there are instruments for indicating the operating conditions. Assuming that the governors in operation are adjusted for 500 r. p. m. and the incoming machine is normally adjusted for 510 r. p. m. underload and 500 r. p. m. full load; the incoming machine would by means of the synchronizing device have its governor adjusted to maintain the speed of the machine at about 500 r. p. m. so that it would only take its share of the load. As soon as the turbine assumes its load the synchronizing device is caused to adjust the governor so that the machine will take its proper share of the load. The speed of the machine may be a little above or below that of the other machines. This is due to the peculiar characteristics of the generator.

In addition to using the synchronizing device for bringing the incoming machine up to speed or into step with the other or others, it is used to proportion the load on the incoming machine, that is to say, it is sometimes desirable to carry a little more or a little less of a load on the incoming machine for a particular condition of service. This is rendered possible by means of the synchronizing device.

From the foregoing it is evident that some means are necessary to synchronize the operation of the turbines when working in battery, and that it is also desirable at times to adjust the governor in order that it may meet the load conditions.

The specific means employed for adjusting and synchronizing the governors will now be described. Extending outwardly from the dome is a support comprising a tubular sleeve 95 in which is mounted a sleeve 96 which is capable of being rotated by the governor motor under certain conditions. To the under side of the fixed sleeve 95 is attached a bracket 97 which supports the circuit-breaker for opening the circuit of the governor motor under certain predetermined conditions, for example when the auxiliary spring has attained its maximum or minimum tension. Rigidly secured to the rotating sleeve 96 by a pin or otherwise is a lead-screw 98 which on its left-hand end is provided with an opening to receive the end of the screw-threaded rod 99. The opposite end of the rod is pivotally attached to one arm of the lever 21. Mounted on the rod is a screw-threaded piece or adjustable abutment 100 which is provided with key-like ends that enter key slots 105 in the rotating sleeve 96 so that the two will move in synchronism. Between the movable abutment and the right-hand end of the sleeve is a compression spring 106, the effect of which is added to that of the main compression spring 88. Mounted on the right-hand end of the rotating sleeve 96 is a worm wheel 107 which is rotated by the worm 108. Mounted on an extension of the dome is a governor motor 24 and on the end of its armature shaft is the worm 108 meshing with the worm wheel.

Referring more particularly to Fig. 13, the means employed to interrupt the circuit of the motor, after it has adjusted the tension of the compression spring 106 between certain predetermined limits, will be described. Mounted on the end of the bracket 97 is a detachable insulating base 109, or the base may be made of metal with insulated contacts. This base is provided with stationary contacts 110 and 111 and two movable spring contacts 112 and 113. The base is also provided with a groove 114 in which travels the lower end of a nut 115 that is carried by the lead-screw 98. Extending in opposite directions from the lower end of the nut are devices for moving the spring contacts 112 and 113 away from the fixed contacts 110 and 111 respectively. The said devices are adjustable so that the point for interrupting the circuit of the motor can be varied. Since the nut 115 is prevented from rotating it follows that when the lead-screw 98 is rotated by the worm wheel 107, the nut will be fed in one direction or the other depending upon the direction of rotation of the worm wheel. The moving and stationary contacts are so arranged that when they are separated by reason of the nut 115 forcing them out of engagement the motor will stop. To state the matter in a different way, the nut 115, together with the devices controlled thereby, constitutes a device for determining the upper and lower limits of the tension to which the auxiliary governor spring 106 can be subjected. When the movable abutment 100 moves toward the right it compresses the auxiliary spring, hence the effect thereof on the governor weights is increased. On the other hand, if the abutment is moved to the left, the effect of the spring decreases. As the effect of the spring increases the amount of steam admitted to the turbine will naturally increase under the same conditions of operation, because the lower governor balls will assume a new position at a point somewhat nearer to the axis of rotation than before.

Referring to Fig. 15, we have illustrated diagrammatically the circuit connections of the controller and the governor. It will be noted that the magnets 39 are divided into three principal groups 116, 117 and 118. Each one of these groups controls a corresponding number of nozzle valves such as are described in connection with Fig. 2. The magnets in the groups are connected in multiple, and in circuit with each magnet is a resistance 119 to prevent excessive flow of current thereto. By using a resistance in series with each magnet, the size of the magnet as a whole can be reduced to a minimum, and by varying the amount of resistance in circuit with each magnet the same magnets can be employed for circuits having different potentials.

The resistances are all contained in a box 120 that is bolted to the casing of the turbine, as is shown in Fig. 4, and the circuit wires leading to and from are all inclosed in suitable sheaths or tubes. 60 represents the contact brushes which carry current to and from the several magnets, and 59 the cam cylinder which actuates the brushes. The cam cylinder is moved by the pinion 55 and rack 57.

While we have shown the brushes actuated by a cam cylinder, it is to be understood that our invention is not limited to this, for the brushes can engage with a cylinder in the usual way so that the circuit of the brushes will be interrupted successively. The essential feature of the controller is to provide a means for successively opening and closing the circuits of the magnets as the load conditions vary, and this without excessive arcing. Each of the brushes is connected to a circuit wire, and the several circuit wires are connected to the magnets. The magnets and controller are so arranged that a magnet in group 117 is first energized or deënergized, then a magnet in group 116, then a magnet in group 118, after which the action is repeated.

By means of this arrangement the steam stress is distributed evenly over the bucket wheel or wheels.

16 represents the lever for actuating the controller and the throttle valve, the latter having been omitted in the present figure. 121 and 122 represent the circuit wires of the source of supply. Extending from one of the wires to the controller cylinder via brush 70 is a conductor 123 which supplies current for the several groups of magnets. The opposite terminals of the magnets are connected to the conductor 124 which contains an oil-actuated switch 125 that will be more fully described hereinafter. It is sufficient for the present to say that when the flow of oil to the bearing or bearings of the turbine fails, the circuit of all of the magnets is interrupted, which permits the secondary valves to drop and admit steam to the back of the pistons which operate the nozzle valves and cause them to close and shut off steam to the turbine. This shutting down of the turbine when the supply of lubricant fails is of the utmost importance because otherwise the turbine is liable to be greatly damaged. 24 represents the governor motor and 115 the means for automatically breaking the circuit of the motor when the tension on the auxiliary adjusting spring has reached the prescribed upper or lower limit. 126 is a double-pole switch for interrupting the circuit of the motor.

In order to prevent racing of the turbine in case of failure of the governor to operate, an auxiliary emergency governor is provided which is best illustrated in Figs. 16, 18, 21 and 22. Referring more particularly to these figures, 80 represents the main shaft of the turbine, and mounted thereon at two or more points are holders 127 which carry centrifugally acting weights. These weights are normally held within a certain prescribed path by suitable means, but when the speed becomes excessive they fly outwardly beyond their normal path and cause the interruption of the steam supply. Fig. 18 best shows the construction and arrangement of these weights. 128 represents a weight which is pivoted to the carrier 127, the latter being secured to the shaft by a number of bolts. The lever is provided with two arms, one of which is adapted to strike the head of the plunger 130 under conditions of excess speed, the other engaging with a spring-pressed abutment 131. The abutment is mounted within a tubular sleeve 132 which is supported by trunnions 133, one of which is shown in dotted lines. The tension of the compression spring mounted in the sleeve is adjusted by the adjusting screw 134. It will be observed that the point of contact between the short arm of the lever 128 and the movable abutment 131 is at one side of the straight line connecting the center of the trunnion 133 and the center of the pivot 129. As the shaft rotates, the weight 128 tends to move outwardly and compress the spring. In doing so the point of contact more nearly coincides with the line connecting the centers of movement above referred to. As designed, so long as the speed of the turbine is normal, the point of contact between the short arm and the abutment is always on the side of the center line as shown, but under excess speed conditions the point of contact crosses the dead center and the effect of the compression spring is then added to that of the centrifugally acting weight. By this means a blow is imparted to the plunger 130 and insures the prompt action of the valve for interrupting the supply of fluid. The right-hand end of the plunger engages with a lever 135 which is pivotally connected to a rod 136. This rod extends outwardly from the shaft and is attached at its outer end to a lever 137 which trips the mechanism that actuates the butterfly valve 138, the latter being mounted in the steam-carrying conduit 139 at a point between the main or gate valve and the conduit 8 which conveys fluid to the groups of nozzles.

Referring to Figs. 21 and 22, the construction and operation of the means for actuating the butterfly valve will be described. The valve is pivotally supported on a shaft 140 to which is attached an arm 141. This arm is provided with a pin 142, shown in dotted lines, Fig. 21 and full lines Fig. 22, for preventing it from rising above the position shown, it being free however to move downward under the action of the releasing mechanism. Pivotally attached to the arm is a V-shaped lever 143 the short arm of which engages with and is locked in position by a shoulder or trigger formed on the lever 137. To the long arm of the V-shaped lever is attached a link 144 that supports the weight 145. Attached to the side of the conduit 139 is a relief pipe 146 containing a valve 147. As shown the valve is provided with a stem 148 which projects slightly from the valve casing and is adapted to engage with and be depressed by a cam 149 that is attached to and moves with the valve shaft 140. The object of this valve is to discharge the contents of the steam-carrying conduit 8 into the condenser 30 or to the atmosphere, as the case may be, whenever the emergency governor operates. In Fig. 1 the discharge pipe 146 is shown connected to the condenser so that the discharged steam shunts the wheel or wheels. By relieving the conduit of all of the steam contained therein the turbine may be quickly stopped, otherwise it might run for a considerable time providing it had been relieved of its load. In order to release the butterfly valve by hand when for any reason it is desirable, handles 150 are attached to the lever 137. These handles are best shown in Fig. 22. It will be noted that they are situated on opposite sides of the conduit where they are readily accessible. The relation between the cam 149 and the valve stem 148 is also well shown. In the present instance the valve is normally held against its seat and is opened by the cam 149 which compresses the spring, but any other suitable form of valve can be employed. The relation of the pin 142 to the arm 141 for preventing the latter from rising beyond a certain predetermined point is also clearly shown in this figure. By the arrangement described the turbine can quickly be brought to a standstill without letting air into the condenser.

Referring to Fig. 19, we have shown a slight modification of our invention wherein the actuating lever 135 is arranged to work in a horizontal plane instead of a vertical plane. The object of this arrangement is to cause the centrifugally and differentially acting weight 128 to strike the lever a glancing blow as the heavier end moves outward under conditions of abnormal speed. The weight 128 is provided with a pivot 129 located at a point between its ends, and the trailing portion 175 of the weight is heavier than the leading portion and thus overpowers it. Under conditions of excess speed the heavier portion 175 moves outward while the forward and lighter end moves inward. By reason of this differential action the spring which opposes the weight can be made shorter. The weight is carried by a support 127 that is bolted to the main shaft 80. The lever 135 Fig. 19, is mounted in a support 176 which is bolted to a stationary part of the turbine frame. It is made in the form of a bell crank and the short arm is attached by the rod 136 to the trigger or tripping device 137 shown in Fig. 16. There is a certain amount of lost motion between the short arm of the lever 135 and the nuts on the rod 136. The object of this arrangement is to decrease the effect of the blow from the weight 128 on the curved arm of the lever 135. In this figure, as well as in Fig. 18, the relative arrangement of the parts may be such that after the speed of the turbine decreases by a certain amount the weight 128 will return to its normal position. It can, however, be so arranged that it requires the operator to push the weight back manually before restarting the turbine into operation.

Referring to Fig. 20, we show in vertical section the fluid actuated switch 125 previously referred to in connection with Fig. 15. The switch comprises a casing having two cylindrical openings in which is mounted a double piston having heads 151 and 152. Fluid is admitted to the cylinder through the opening 153 and leaves the cylinder by the opening 154. It will be noted that the pistons are perforated at 155 and 156. The object of this arrangement is to enable the switch to open in case there is a stoppage in the oil pipes or bearing. The piston may be arranged to make a loose fit with the cylinder in which case the perforations may be dispensed with. In other words, the switch depends for its action upon the flow of oil as distinguished from a switch dependent upon oil pressure to hold it in position. It is evident that a condition might occur wherein the pressure on the fluid system was normal, yet owing to some choke in the pipes or elsewhere no oil would be flowing to the bearing or bearings. Hence the liability to injury of the latter would be as great as though the pressure on the oil system had ceased altogether. It is to meet such a condition that the present switch is intended.

Mounted above the upper piston head is a contact spring 157 which is adapted to engage the fixed contacts 158 that are connected to the two parts of the conductor 124. When the contact piece 157 engages the contacts 158 the continuity of the return circuit of the magnets is complete; but as soon as the switch drops to the position shown, the circuit of all the magnets is interrupted and the supply of steam to the turbine cut off. The contacts are carried by a detachable head 159, and between this head and the upper piston is a compression spring 160 that tends at all times to force the parts downward to the position shown. The spring is held away from the contacts by a tubular body of insulation 161. As the oil under pressure flows through the opening 153 it causes the balanced piston to rise and close the circuit of the contacts 158. When the parts are in the operative position the space surrounding the contacts will be filled with oil under pressure, which oil passes through the openings 156, as will also be the space between the opposite piston heads. It will be noted that the piston always has a tendency to drop due to gravity and to the action of the compression spring 160. This tendency to drop is opposed by the flow of oil from the passage 153 to the passage 154. In Fig. 1 the step bearing for the wheel shaft is shown in dotted lines also the pipe 31 supplying oil thereto. The switch in Fig. 15 shows the pipe 31 leading from the switch, and also the receiving pipe 32 which is connected to the pump or other source of fluid supply.

Referring to Fig. 23, we have shown a slight modification of the means employed to actuate the controller. This feature was also referred to in connection with Fig. 9. Mounted on the end of the cam shaft of the controller 15 is a sleeve 78 to which are attached the metal ribbons 76 and 77. These ribbons are wrapped around the sleeve in opposite directions and one of them is connected to the lower end of the bell-crank governor lever 21, and extends over a pulley 162 that is supported by a bracket carried by the cover 19 of the dynamo. A throttle valve 14 is provided as before and the stem thereof is connected by a link 163 with the lever 164. The lever is pivoted at one end to a bracket 165 carried by a stationary support, and the opposite end is provided with a clamp 166 for attaching it to the ribbon 76. The lower end of the second ribbon 77 is attached to an extension spring 167, the lower end of which is secured to a bracket attached to a fixed support. As the lever 21 swings around its pivot under the action of the centrifugally and differentially acting weights, oscillatory motion is imparted to the cam cylinder, and reciprocating motion to the throttle valve 14. The clamp 166 and the ribbon are so related to each other, and the friction of the throttle valve and controller is such that the first portion of the movement of the governor lever 21 from a given position causes the piston valve to operate, after which the controller is operated. To state the matter in a different way, there is a lost-motion connection between the throttle valve 14 and the controller whereby the valve and the controller are permitted to have dissimilar movements.

Referring to Fig. 24, we have shown diagrammatically the relation of the separate columns of steam or other fluid that are being delivered to the bucket wheel, the said columns being controlled by the groups of nozzles 116, 117 and 118, described in connection with Fig. 15. 168, 169 and 170 represent three columns of fluid having such a cross-section that the proper amount of fluid can pass to the bucket wheel or wheels to furnish the necessary power. It has been before pointed out that the width of the stream or length of arc covered by the sections of the column of fluid is varied by a plurality of separately actuated nozzle valves which have an open and a closed position but no intermediate, and a throttle valve which operates between the opening and closing of each nozzle valve. In the figure it is assumed that the average number of nozzles is in service and that for some reason the load is decreased. This means that the governor will move the throttle valve 14 and the width of the column 168 will be gradually decreased. The width of the column gradually decreases from the line 171 to the line 172. When its limit is reached one of the separately actuated valves comes into play and cuts out one nozzle section in an adjacent group, as for example, 169. This decrease in width is represented by the dotted line 173. As soon as the section is cut out the throttle valve assumes a position depending upon the load conditions; it may be full open or closed, or at an intermediate point as is represented by the dotted line 174. A further change in load conditions will cause the throttle valve to assume its open or closed position, after which a nozzle section is cut into or out of service as the case may be. The throttle valve acts on the leading side, and the independent nozzle valves on the trailing side of the column. In this manner the sides only of the separate columns are affected, and the continuity of the intermediate portion is preserved at all times. We have found it sufficient to use a single throttle valve, which acts between each pair of nozzle valves, but we do not limit ourselves to this, since more can be employed if desired.

We have described our invention in connection with a jet machine but we desire to have it understood that certain of the novel features are applicable to other types of turbines and we aim to embrace such a use in the claims.

The emergency valve and the actuating mechanism therefor, and the synchronizing mechanism are not specifically claimed herein, because they form the subject matter of our divisional applications, S. N. 281237, filed October 4, 1905 and S. N. 341,430, filed October 31, 1906, which divisions were made at the requirement of the United States Patent Office under Rules 41 and 42.

In accordance with the provisions of the patent statutes we have described the principle of operation of our invention, together with the apparatus which we now consider to represent the best embodiment thereof; but we desire to have it understood that the apparatus shown is only illustrative, and that the invention can be carried out in other ways.

What we claim as new and desire to secure by Letters Patent of the United States is,

1. In combination, a plurality of separately actuated valves, nozzles or nozzle sections controlled thereby, and a means anticipating the movement of the valves, for varying the effective discharge of a nozzle or nozzle section.

2. In combination, a plurality of nozzles or nozzle sections, a plurality of separately actuated valves, each having an open and a closed position but no intermediate, and a valve for varying the effective discharge of a nozzle or nozzle section.

3. In combination, a plurality of separately actuated means for varying the cross-sectional area of a fluid column, with a device acting between the opening and closing of each two of the said means for varying the total volume of fluid delivered thereby.

4. In combination, a plurality of separately actuated valves controlling the admission of elastic fluid to a motor, with a means which precedes the action of each valve for admitting or cutting off a volume of fluid which is less than that controlled by one of the first-mentioned valves.

5. In combination, a valve responsive to speed changes which opens and closes to control the passage of a certain volume of fluid, with a second valve acting on the same fluid, which always precedes the action of the first both opening and closing.

6. In combination, a valve which has an open and a closed position but no intermediate, with a throttle valve acting in conjunction therewith and preceding it in its actions.

7. In combination, a valve responsive to speed changes which controls the passage of fluid, a throttling valve which acts before and after the first-named valve, and a means for regulating the action of the throttling valve.

8. In combination, a valve responsive to speed changes which controls the passage of fluid, a throttling valve which acts before and after the first-named valve, and an automatic governing means which controls the action of the throttling valve.

9. In combination, a valve which controls the passage of fluid, a throttling valve which acts before and after the first-named valve, and an automatic governing means which controls the action of both valves.

10. In combination, a plurality of nozzles or nozzle sections, valves for controlling the passage of fluid therethrough, and a throttling valve which acts before and after the nozzle valves and always on the same nozzle or nozzle section.

11. In a turbine, the combination of a plurality of nozzles which deliver fluid to a piston in the form of a continuous column or belt, valves successively acting on one side of the column or belt to vary its active width, and a throttle valve which always acts on the opposite side of the column or belt.

12. In a turbine, the combination of a plurality of nozzles which deliver fluid to a piston in the form of a continuous column or belt, valves successively acting on one side of the column or belt to vary its width, a valve throttling one portion of the column, and a speed-responsive device which controls the nozzle valves and also the throttle valve.

13. In a turbine, the combination of a plurality of nozzles which deliver fluid to a piston in the form of a continuous column or belt, valves successively acting on one side of the column or belt to vary its width, a throttle valve, and a speed-responsive device which causes the throttle valve to operate before and after a nozzle valve.

14. In combination, means for discharging fluid in the form of a column, a device for varying the cross-sectional area of the column by positively cutting sections thereof into and out of service, and other means acting on the column to gradually vary its cross-sectional area.

15. In combination, separate passages for discharging a column of fluid, and means acting on the column at two points for varying its cross-section.

16. In combination, means for discharging a column of fluid, means acting on both sides of the column for varying its cross-section, and means acting alternately on the sides of the column for varying the cross-sectional area of the column.

17. In combination, a steam chest, a plurality of valves controlling the passage of steam therefrom, a chambered pocket formed in the chest, and a valve which controls the passage of fluid from the chest into the chambered pocket.

18. In combination, a steam chest, a valve controlling the passage of steam therefrom, a chambered pocket which is provided with a valve controlling the delivery, and a balanced throttling valve which controls the passage of steam from the chest to the pocket.

19. In combination, an electrically actuated means for controlling the amount of fluid supplied to an elastic-fluid motor, and mechanically actuated controlling means acting in conjunction with the first.

20. In combination, a pair of regulating devices, one for fine and the other for coarse regulation, and an automatic governing means which acts successively on said devices.

21. In combination, a throttle valve for fine regulation, a valve which has an open and a closed position but no intermediate for coarse regulation, and a speed-responsive device which acts on the valves successively.

22. In combination, a regulating device for fine regulation, a second regulating device for coarse regulation, a speed-responsive device, and a lost-motion connection between the speed-responsive device and the two devices for operating them successively.

23. In combination, independent regulating devices, a lever which is pivotally connected to both of said devices, and a speed-responsive device which actuates the lever.

24. In combination, independent regulating devices, a speed-responsive device, and means actuated by the speed-responsive device for imparting reciprocating motion to one of said devices and rotary or rocking motion to the other.

25. In combination, a regulating device comprising a balanced valve, a second regulating device comprising relatively movable contacts, an automatic governing device, and a connection between the governing device and the regulating devices for successively actuating them.

26. In combination, a plurality of separately actuated valves for regulating the admission of a column of fluid to the wheel of a turbine, with a conduit which supplies fluid under pressure to all of the valves, and an emergency device which closes the conduit to the source of supply and discharges its contents.

27. In combination, nozzles for delivering fluid to the wheel of a turbine with a conduit that supplies fluid to the nozzles, and an emergency device which empties the conduit of its contents.

28. In combination nozzles arranged in groups around the wheel of a turbine, with a conduit which supplies fluid to all of the groups, a cut-off valve, an auxiliary means for cutting off the supply of fluid to the conduit, and a second conduit for emptying the first after the said auxiliary means acts.

29. In a turbine, the combination of a bucket wheel, a conduit which encircles the wheel, valve chests connected to the conduit and receiving motive fluid therefrom, a plurality of nozzles which receive fluid from the valve chests and deliver it to the wheel, and valves located within the chests for controlling the passage of fluid from the conduit to the wheel.

30. In combination, nozzles for discharging fluid to a bucket wheel, valves for the nozzles, a steam-carrying conduit, an emergency valve mounted therein, a relief valve for releasing the contents of the conduit, and a means for successively actuating the emergency and relief valves.

31. In combination, nozzles for delivering fluid to the buckets of a wheel, a conduit, an emergency valve mounted therein, a relief valve, a shaft for operating the emergency valve, a means movable with the shaft for actuating the relief valve, and a weight which first closes the emergency valve and then opens the relief valve.

32. In a governing mechanism, the combination of a fluid-carrying conduit, a plurality of passages receiving fluid from the conduit and delivering it to a bucket wheel, a condenser, a connection from the conduit to the condenser which shunts the wheel, and a means controlling the passage of fluid therethrough.

33. In a governing mechanism, the combination of a fluid-carrying conduit, means receiving fluid from the conduit and delivering it to a bucket wheel, regulating devices for varying the volume of fluid delivered by the means, a condenser, and an emergency governor responsive to abnormal conditions, comprising a valve which cuts off the supply of motive fluid to the conduit and a second valve that discharges the contents of the conduit into the condenser.

34. In a governing or controlling device, the combination of a contact cylinder, brushes mounted for engagement with the cylinder, and means for successively lifting the brushes from the cylinder.

35. In a governor or controlling device, the combination of two cylinders, brushes and their holders, and means arranged on one cylinder for raising the brushes from the other.

36. In a governor or controlling device, the combination of a pair of cylinders which are geared together, and a plurality of contact devices which normally engage with one cylinder and are moved out of engagement therewith by the other cylinder.

37. In a governor or controlling device, the combination of parallel cylinders, pivotally supported contact devices, and means on one cylinder for forcing one end of the device away from its axis and causing the said device to break circuit with the other cylinder.

38. In a governor or controlling device, the combination of a pair of cylinders, gearing between the cylinders, and devices which make electrical contact with one cylinder and are actuated by the other.

39. In a governor or controlling device, the combination of a contact cylinder, a cam cylinder, contact devices moved by the cam cylinder out of engagement with the controller cylinder, and means urging the devices into engagement with the contact cylinder.

40. In a governor or controlling device, the combination of a pair of cylinders, gearing between the cylinders, contact devices situated between and acting on the cylinders, and pivots for the devices which are located nearer one end than the other.

41. In a governor or controlling device, the combination of parallel cylinders, means for driving one cylinder faster than the other, and contact devices actuated by one of said cylinders and making electrical contact with the other.

42. In a governor or controlling device, the combination of a pair of cylinders, a spring belt which drives one cylinder faster than the other, and contact devices between the cylinders, which are moved by one into and out of action with the other.

43. In combination, a contact cylinder, brushes pivotally mounted for engagement therewith, and a device for actuating the brushes through a lost-motion connection.

44. In combination, a contact cylinder, brushes mounted for engagement therewith, and mechanism including a lost-motion connection for separating the cylinder and brushes.

45. In combination, a pair of spring plates which are secured together, a pivot therefor, a contact brush which is mounted between the ends of the plates and held in place by their spring-like action, and a means for moving the plates on the pivot.

46. In a governor or controlling device, the combination of a pair of cylinders occupying positions parallel to each other, an inclined support situated in back of the cylinders, and contact devices mounted on the support and arranged to engage one cylinder and to be actuated by the other cylinder.

47. In combination, a fluid motor, a governor therefor, and a fluid-actuated device responsive to changes in the supply of lubricant to the motor for modifying the action of the governor.

48. In combination, a fluid motor, a governor therefor, and a fluid-actuated device responsive to changes in the supply of lubricant to the motor for causing the governor to shut down the motor under abnormal conditions.

49. In combination, a fluid motor, a governor therefor comprising electrically actuated devices, and a fluid-actuated switch that modifies the action of the devices under abnormal conditions.

50. In combination, a plurality of independent valves for varying the volume of fluid delivered to a fluid motor, means for operating the valves as the conditions of service change, and a device actuated by a separate source of fluid under abnormal conditions, which causes the valves to close.

51. In combination, a plurality of independent valves for regulating the admission of fluid to a fluid motor, a speed-responsive device which controls the action of the valves, and a fluid-actuated device which renders the speed-responsive device inoperative under certain predetermined conditions.

52. A turbine governing mechanism comprising a plurality of nozzles for delivering fluid to a wheel, a plurality of separately actuated valves which have a tendency at all times to close, and an automatic governor, in combination with a fluid-actuated device which disconnects the governor from the valves and permits the latter to close under abnormal conditions.

53. In combination, a valve for controlling the passage of fluid, contacts which are relatively movable and control the valve, and a means depending upon the flow of a fluid for holding them in a predetermined relation.

54. In combination, a valve controlling the passage of fluid, contacts which are relatively movable and control the valve, and a piston that imparts relative movement to and is maintained in its operative position by the flow of a fluid.

55. In combination, contacts which are relatively movable, a perforated piston for imparting relative movement to the contacts, which is dependent upon the flow of a fluid to hold it in operative position, and a means which urges the piston against the fluid flow.

56. In combination, contacts which are relatively movable, a balanced piston for imparting relative movement to the contacts, which is dependent for its action on the flow of a fluid, and a means which at all times opposes the flow of the fluid so that when it decreases by a certain predetermined amount the contacts will move in the opposite direction.

57. In combination, contacts which are relatively movable, a double-area piston, a casing therefor, admission and discharge passages in the casing which permit of a continuous fluid flow, and a spring which opposes the fluid flow and separates the contacts when said flow is reduced below a certain predetermined amount.

58. In combination, a fluid-actuated motor, with automatic means responsive to variations in the supply of lubricant for shutting down the motor.

59. In combination, a fluid-actuated motor, a means for supplying lubricant to a bearing on the motor, and means responsive to change in the lubricant supply for stopping the motor.

60. In combination, a fluid-actuated motor, a bearing therefor, a means for supplying lubricant to the bearing, and means responsive to variations in the flow of lubricant for rendering the motor inoperative.

61. The combination with an elastic-fluid turbine, of a series of nozzles adapted to admit fixed volumes of elastic-fluid, and a nozzle adapted to admit a variable volume of elastic fluid in addition thereto.

62. The combination with an elastic-fluid turbine, of a series of nozzles adapted to admit fixed volumes of elastic fluid, and a valve-controlled nozzle adapted to admit a variable volume of elastic fluid in addition thereto, the valve therefor being actuated in conformity with the speed of the engine.

63. In a governor, the combination of a rotating element, independent centrifugally acting speed-responsive devices driven by the said element and rotating about the same axis, one of said devices operating during normal load changes and the other during abnormal load changes, and a valve arranged to be actuated by each of the speed-responsive devices.

64. The combination with an elastic-fluid turbine, of a series of nozzles adapted to admit fixed volumes of elastic fluid, and a nozzle adapted to admit a variable volume of elastic fluid in addition thereto, with means for controlling the supply to the main nozzles and the variable nozzle in conformity with the load of the engine.

65. The combination with an elastic-fluid turbine, of a series of nozzles, valves adapted to control the flow of fluid to the nozzles successively, means for actuating said valves, a supplemental nozzle, and a valve adapted to admit a variable volume of fluid thereto.

66. The combination with an elastic-fluid turbine, of a series of nozzle valves adapted to admit fluid successively, means for actuating said valves depending on the speed of the engine, with independent supply means for variably increasing the volume admitted by one of said nozzle valves.

67. The combination with an elastic-fluid turbine, of a series of nozzle valves adapted to admit fluid successively, means for actuating said valves depending on the speed of the engine, with means for variably increasing the volume admitted by one of said nozzle valves, controlled by means subject to variations in the speed of the engine.

In witness whereof we have hereunto set our hands this sixth day of May, 1903.

WILLIAM L. R. EMMET.
OSCAR JUNGGREN.

Witnesses:
ALEX. F. MACDONALD,
GENEVIEVE HAYNES.